United States Patent
Champion et al.

(10) Patent No.: US 7,122,257 B2
(45) Date of Patent: Oct. 17, 2006

(54) FUEL CELL REACTANT SUPPLY

(75) Inventors: David Champion, Lebanon, OR (US); Philip H. Harding, Albany, OR (US); Richard W. Seaver, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 545 days.

(21) Appl. No.: 10/167,356

(22) Filed: Jun. 10, 2002

(65) Prior Publication Data

US 2003/0228501 A1    Dec. 11, 2003

(51) Int. Cl.
*H01M 14/00* (2006.01)
*H01M 8/00* (2006.01)
*H01M 8/04* (2006.01)

(52) U.S. Cl. .............. 429/3; 429/12; 429/13; 429/4; 429/17; 429/22

(58) Field of Classification Search .......... 429/3, 429/12, 13, 4, 17, 22
See application file for complete search history.

(56) References Cited

U.S. PATENT DOCUMENTS

| | | | |
|---|---|---|---|
| 3,338,747 A | 8/1967 | Plust et al. | |
| 4,652,501 A | 3/1987 | Bennetto et al. | |
| 4,988,283 A | 1/1991 | Nagasawa et al. | |
| 5,260,143 A | 11/1993 | Voss et al. | |
| 6,093,502 A * | 7/2000 | Carlstrom et al. | 429/25 |
| 6,096,448 A * | 8/2000 | Wilkinson et al. | 429/13 |
| 6,210,820 B1 * | 4/2001 | Knights et al. | 429/13 |
| 6,391,485 B1 * | 5/2002 | Perry | 429/13 |
| 2001/0028966 A1 | 10/2001 | Knights et al. | |

FOREIGN PATENT DOCUMENTS

| | | |
|---|---|---|
| EP | 1284514 | 2/2003 |
| JP | 2002151115 | 5/2002 |
| WO | WO0161777 | 8/2001 |
| WO | WO0237588 | 5/2002 |

OTHER PUBLICATIONS

Holmgren, et al., "A Model of Oxygen Transport in Pt/Ceria Catalysts from Isotope Exchange", Journal of Catalysis, 182:441-448, 1999.

* cited by examiner

*Primary Examiner*—Patrick Joseph Ryan
*Assistant Examiner*—Angela J. Martin (57) ABSTRACT

A fuel cell system in accordance with a present invention includes a fuel supply apparatus that supplies at least one reactant in a pulse.

56 Claims, 5 Drawing Sheets

FUEL CELL REACTANT SUPPLY

BACKGROUND OF THE INVENTIONS

1. Field of the Inventions

The present inventions are related to fuel cells and fuel cell reactant supply systems.

2. Description of the Related Art

Fuel cells, which convert reactants (i.e. fuel and oxidant) into electricity and reaction products, are advantageous because they possess higher energy density and are not hampered by lengthy recharging cycles, as are rechargeable batteries, and are relatively small, lightweight and produce virtually no environmental emissions. Nevertheless, the inventors herein have determined that conventional fuel cells are susceptible to improvement. More specifically, the inventors herein have determined that it would be advantageous to provide improved systems for supplying reactants to the fuel cell electrodes.

Conventional fuel cell reactant supply systems continuously pump a reactant stream past the fuel cell electrodes and the reactants react with the electrodes as they travel along the surface of the electrodes. The inventors herein have determined that the reactant concentration at the inlet end of an electrode is much greater than the reactant concentration at the outlet end and, as a result, the reaction conditions vary along the length of the electrode surfaces. Such variations make it difficult to efficiently utilize the entire reactive surface of the electrodes. In addition, the reaction products from the fuel consumed at the inlet mix with the incoming fuel, further reducing the efficiency of the fuel cell.

BRIEF DESCRIPTION OF THE DRAWINGS

Detailed description of preferred embodiments of the inventions will be made with reference to the accompanying drawings.

DETAILED DESCRIPTION OF THE PREFERRED EMBODIMENTS

The following is a detailed description of the best presently known modes of carrying out the inventions. This description is not to be taken in a limiting sense, but is made merely for the purpose of illustrating the general principles of the inventions. It is noted that detailed discussions of fuel cell structures that are not pertinent to the present inventions have been omitted for the sake of simplicity. The present inventions are also applicable to a wide range of fuel cell technologies, including those presently being developed or yet to be developed. Thus, although various exemplary fuel cell system are described below with reference to solid oxide fuel cells ("SOFCs"), other types of fuel cells, such as proton exchange membrane ("PEM") fuel cell, are equally applicable to the present inventions. Additionally, although the exemplary fuel cell stacks have anodes facing one another, it should be noted that the inventions herein are applicable to the traditional bipolar configuration as well as the monopolar design.

Figure 1:
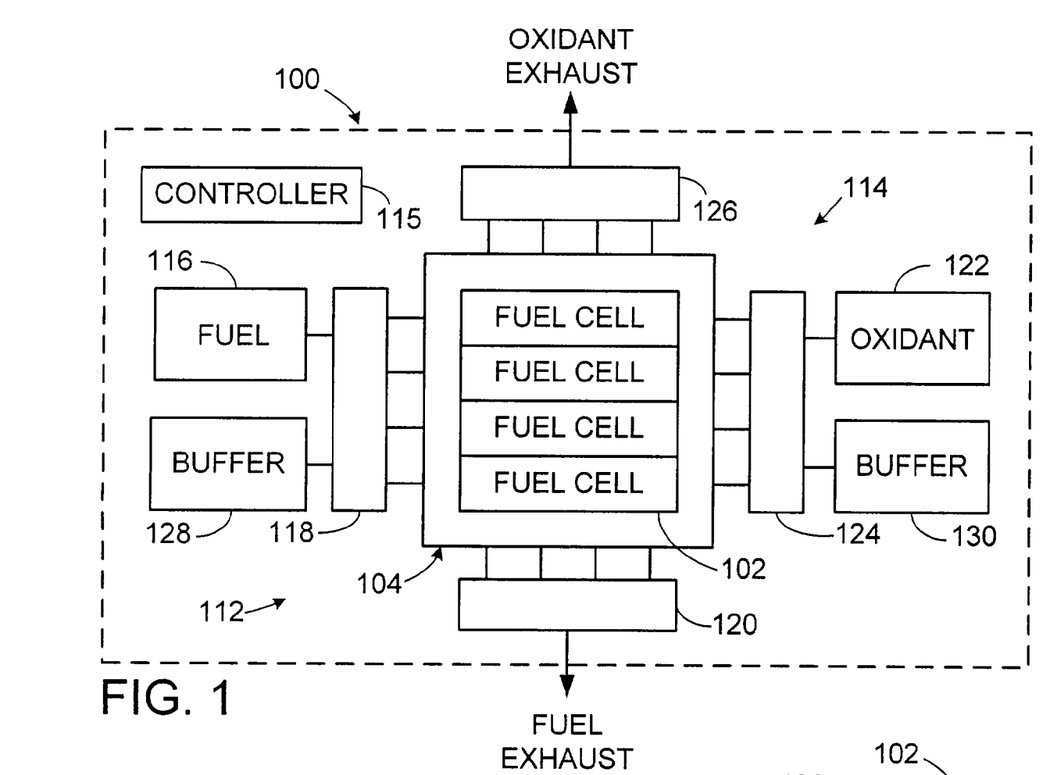
FIG. 1 is a diagrammatic view of a fuel cell system in accordance with a preferred embodiment of a present invention.
Figure 2:
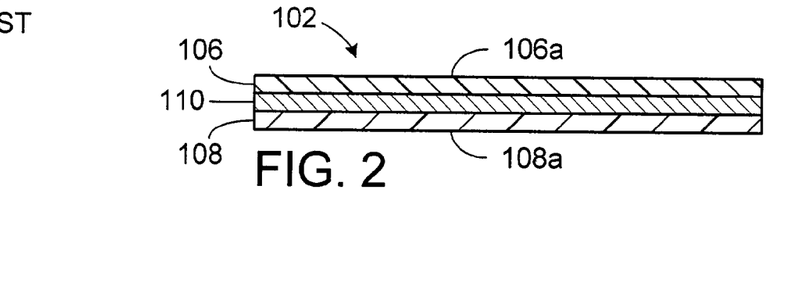
FIG. 2 is a section view of a fuel cell in accordance with a preferred embodiment of a present invention.

As illustrated for example in FIGS. 1 and 2, a fuel cell system 100 in accordance with one embodiment of the present invention includes a plurality of solid oxide fuel cells 102 arranged in a stack 104. Each fuel cell 102 includes an anode 106 and a cathode 108 separated by an electrolyte 110. The anode 106 and cathode 108, on opposing faces of the electrolyte 110, are each composed of a thin catalyst layer and, optionally, a gas diffusion layer. A fuel supply system 112 supplies fuel, such as $H_2$, hydrocarbon fuels such as $CH_4$, $C_2H_6$, etc., and CO, to the anodes 106 by way of a manifold (not shown) and an oxidant supply system 114 supplies oxidant, such as $O_2$ or air, to the cathodes 108 by way of a manifold (not shown). The fuel is electrochemically oxidized at the anode catalytic surfaces 106a, thereby producing ions that diffuse across the conducting electrolytes 110 and react with the oxygen at the cathode catalytic surfaces 108a to produce a by-product (water vapor and $CO_2$ in the exemplary embodiment). A controller 115 may be provided to monitor and control the operations of the exemplary fuel cell system 100 in the manner described below. Alternatively, the operation of the fuel cell system may be controlled by the host (i.e. power consuming) device.

The exemplary fuel supply system 112 includes a pressurized fuel source 116, an inlet metering device, such as the exemplary valve system 118, for controlling the flow of fuel to the anodes 106, and an outlet metering device, such as the exemplary valve system 120, for controlling the flow of exhaust from the anodes. The exhaust typically includes reaction products and unused fuel. The oxidant supply system 114 includes a pressurized oxidant source 122, an inlet metering device, such as the exemplary valve system 124, for controlling the flow of oxidant to the cathodes 108, and an outlet metering device, such as the exemplary valve system 126, for controlling the flow of exhaust from the cathodes. The exhaust typically includes reaction products and unused oxidant. The exemplary valve systems preferably include a plurality of valves that are able to independently control the flow of reactants into and out of each fuel cell 102. In the illustrated embodiment, the fuel and oxidant supply systems 112 and 114 are also provided with pressurized sources of buffer material 128 and 130 that are connected to the fuel cells by way of the valve systems 118 and 124. The buffer material is discussed in greater detail below.

Figure 3:
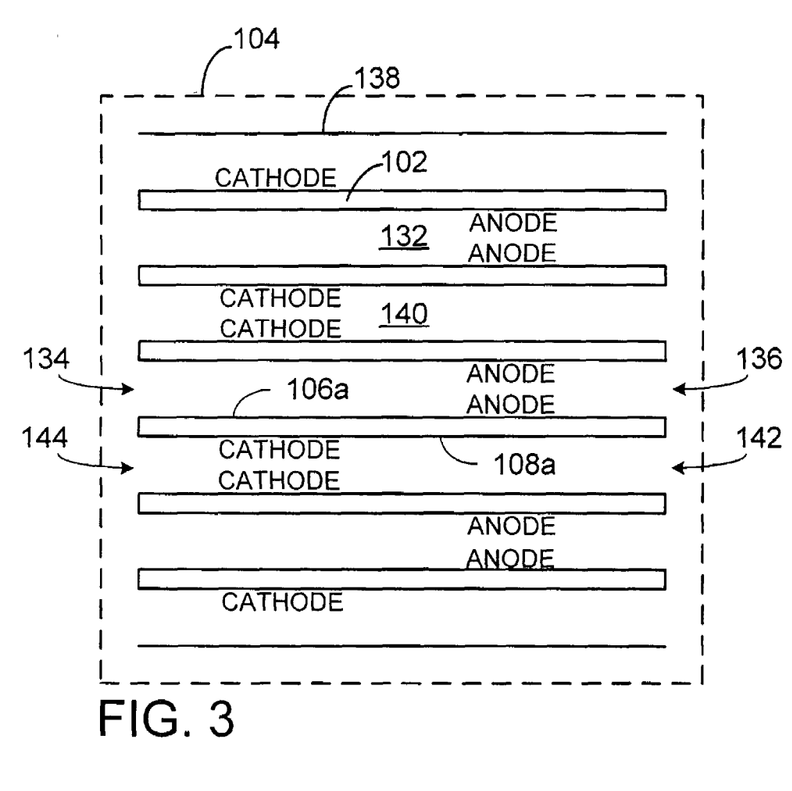
FIG. 3 is a diagrammatic view of a fuel cell stack in accordance with a preferred embodiment of a present invention.

Referring to FIG. 3, the individual cells 102 in the exemplary system 100 are stacked such that the anodes 106 of adjacent cells face one another with a space therebetween (e.g. about 0.001 mm to 5 mm), as do the cathodes 108. So arranged, the spaces between adjacent anodes 106 define fuel passages 132 having inlets 134 and outlets 136, while the spaces between adjacent cathodes 108 (or a cathode and a wall 138 the ends of the stack) define oxidant passages 140 having inlets 142 and outlets 144. Adjacent anodes 106 may be connected to one another in parallel, and their respective cathodes 108 may also be connected in parallel, and the parallel pairs of anodes are connected in series to the next parallel pairs of cathodes. The preferred connection scheme depends on the power requirements of the load. The fuel and oxidant passages 132 and 140 in the exemplary embodiments may be a simple volume (as shown) or a single tortuous path. Alternatively, as discussed below with reference to FIG. 6, one or more of the fuel passages and/or one or more of the oxidant passages may be in the form of a multiple channel passage that is either simple or tortuous.

The reactant supply system may be used to supply the reactants in a series of pulses. In the exemplary implementation illustrated in FIGS. 1–5, the fuel supply system 112 supplies fuel pulses to the catalytic surfaces 106a of the anodes 106 and the oxidant supply system 114 supplies oxidant pulses to the catalytic surfaces 108a of the cathodes 108. Preferably, a fuel pulse is provided by opening the valve in the valve system 118 that is associated with a particular fuel passage inlet 134 and closing the valve in the valve system 120 that is associated with the corresponding fuel passage outlet 136. The valve in the valve system 118 that is associated with the inlet 134 will be closed after the desired amount of fuel from the pressurized source 116 flows into the fuel passage 132. Similarly, an oxidant pulse is provided by opening the valve in the valve system 124 that is associated with a particular oxidant passage inlet 142 and closing the valve in the valve system 126 that is associated with the corresponding oxidant passage outlet 144. The valve in the valve system 124 that is associated with the inlet 142 will be closed after the desired amount of oxidant from the pressurized source 122 flows into the oxidant passage 140.

The reactants will preferably be supplied under relatively high pressure (or vacuum from the exhaust side as discussed below with reference to FIG. 7) so that the reactant in the initial portion (or "leading edge") of a reactant pulse will cross the associated catalytic surface relatively quickly and without substantial reaction. Such pressure should be sufficient to ensure that the fuel and oxidant passages fill quickly and reach a uniform reactant concentration and pressure throughout. When the associated inlet valve is closed, the catalytic concentration of the reactant covering the catalytic surface will be substantially uniform along the direction of reactant flow (i.e. from the inlet to the outlet of the associated electrode). This enables more efficient utilization of the entire catalytic surface of the electrodes and prevents reaction products from the fuel consumed at the inlet from mixing with the incoming fuel.

In the exemplary implementation, the fuel source 116 will supply fuel to a fuel cell 102 at a pressure that is sufficient to cause the fuel in the leading portion of the fuel pulse to quickly flow from the inlet 134 and across the catalytic surface 106a to the closed outlet 136 with little to no reaction. Thus, when the valve associated with the fuel inlet 134 is closed to end the pulse, the fuel concentration within the fuel passage 132 will be substantially uniform across the catalytic surface 106a. Similarly, in the exemplary implementation, the oxidant source 122 will supply oxidant to a fuel cell 102 at a pressure that is sufficient to cause the oxidant in the leading portion of the oxidant pulse to quickly flow from the inlet 142 and across the catalytic surface 108a to the closed outlet 144 with little to no reaction. As a result, when the valve associated with the oxidant inlet 142 is closed to end the pulse, the oxidant concentration within the oxidant passage 140 will be substantially constant across the catalytic surface 108a.

The volume, pressure and frequency of the pulses will depend on the length (in the flow direction) and shape of the fuel passages 132 and oxidant passages 140, the type of reactant being used, the rate of reaction, whether or not a buffer gas is used, the type of catalytic surfaces 106a and 108a, and the desired power output for each fuel cell 102. In one embodiment, the passage volume and operating pressure are designed to yield optimum efficiency and the pulse frequency is determined by the desired power output. For example, a suitable fuel pressure would be about 1 atmosphere ("atm") to about 2 atm where the fuel passage was about 0.1 cm to about 30 cm long, the fuel was $CH_4$ and the catalytic surface was samaria-doped ceria ("SDC") with 30% Ni by weight. Similarly, a suitable oxidant pressure would be about 1 atm to about 2 atm where the oxidant passage was about 0.1 cm to about 30 cm long, the oxidant was air or oxygen and the catalytic surface was $Sm_{0.5}Sr_{0.5}CoO_3$.

Consumption of the reactants, which preferably begins at the end of the pulse, will continue until the fuel is sufficiently depleted to require another pulse. Preferably, subsequent pulses will be required once the anode is near starvation, i.e. to the point where the exothermic reaction rates are insufficient to maintain proper operating temperatures for efficient calalysis. Fuel level (i.e. concentration) may be determined in a variety of ways. For example, the fuel level can be monitored by monitoring the voltage across the cell. Alternatively, when the rate of fuel consumption is known, a clock may be used to determine when the fuel has been depleted to a level that requires the next pulse. Other methods of determining fuel level include measuring current flow, exothermal reaction rate and/or pressure.

Once it has been determined that the fuel level has been depleted to the threshold value, a fuel cell can be idled by not supplying additional fuel, the fuel cell may be purged of reaction products and unused reactants prior to the next reactant pulse with a material other than the reactants in the manner described below, or the next reactant pulse may be immediately provided. Immediately providing the next reactant pulse will also purge the reaction products and unused reactants. More specifically, as the reactions proceed, the number of moles of reaction product will increase, thereby increasing pressure within the fuel and oxidant passages. When the fuel level reaches the threshold value, the associated outlet valve (or other outlet metering device) can be opened and, once the passage pressure has reached equilibrium, the associated inlet valve (or other outlet metering device) can be opened and the next pulse supplied.

The reactant delivery system may also be used to supply material other than the reactants to the catalytic surfaces. The material may, for example, be supplied in one or more pulses between each reactant pulse to purge the catalytic surfaces of unused reactants and reaction products. Alternatively, one or more pulses of the material may be supplied in response to a determination that the material is required. The material may be an inert material, such as Ar, He or Kr, that is simply used to force the unused reactants and reaction products out of the fuel cell. In the preferred implementation, the material is a "buffer" material, which is a material that cleans or conditions the catalytic surface and/or aids in the purging process by reacting with unused reactant (and/or the reaction products).

With respect to the fuel supply system 112, the pressurized source 128 stores buffer gasses, such as water vapor, oxygen or air, that will reform unused hydrocarbons and clean and/or otherwise condition the electrodes of C, CO and/or hydrocarbons and other foreign matter. Buffer gasses stored in the pressurized source 130 in the oxidant supply system, such as water vapor, oxygen or air, will also reform unused hydrocarbons and CO as well as clean and/or otherwise condition the electrodes of C, CO and/or hydrocarbons and other foreign matter. It should be noted, however, that the use of a buffer gas on the oxidant side is primarily associated with those instances where the fuel and oxidant are mixed together and flow over the anode and cathode electrodes simultaneously (as discussed below with reference to FIGS. 8 and 9). Nevertheless, the buffer gas may be used for purposes such as temperature control in those instances, such as the exemplary embodiment illustrated in FIGS. 1–3, where the fuel and oxidant are separated.

Figure 4:
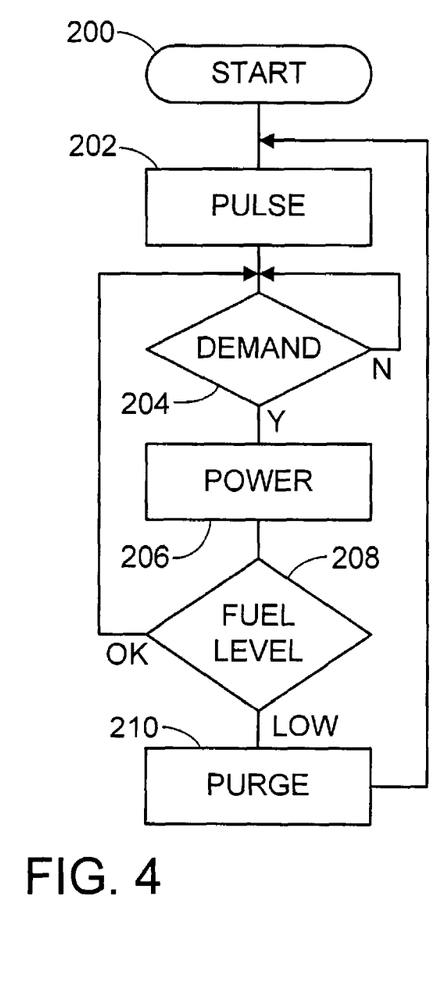
FIG. 4 is a flow chart showing a method in accordance with a preferred embodiment of a present invention.

A summary of the above-described exemplary method of operation is provided in FIG. 4. After the fuel cell system 100 is initiated (Step 200), the fuel and oxidant pulses are supplied to the anode 106 and cathode 108 of a fuel cell 102 (Step 202). Preferably, the fuel and oxidant pulses supplied to an individual fuel cell 102 will be supplied simultaneously. Next, if the device to which the fuel cell system 100 is connected is consuming power (Step 204), either by consuming the power during its normal operations or by using the power to charge a battery or supercapacitor, the fuel and oxidant will be consumed as the fuel cell 102 produces power (Step 206). The power production will continue as long as there is demand and a sufficient level of fuel (Step 208). When the fuel level drops below a predetermined level, the remaining fuel and oxidant will be purged from the fuel cell (Step 210), preferably by buffer material pulses, and the next fuel and oxidant pulses will be supplied. Alternatively, the system will simply remain idle until the next fuel and oxidant pulses.

Figure 5:
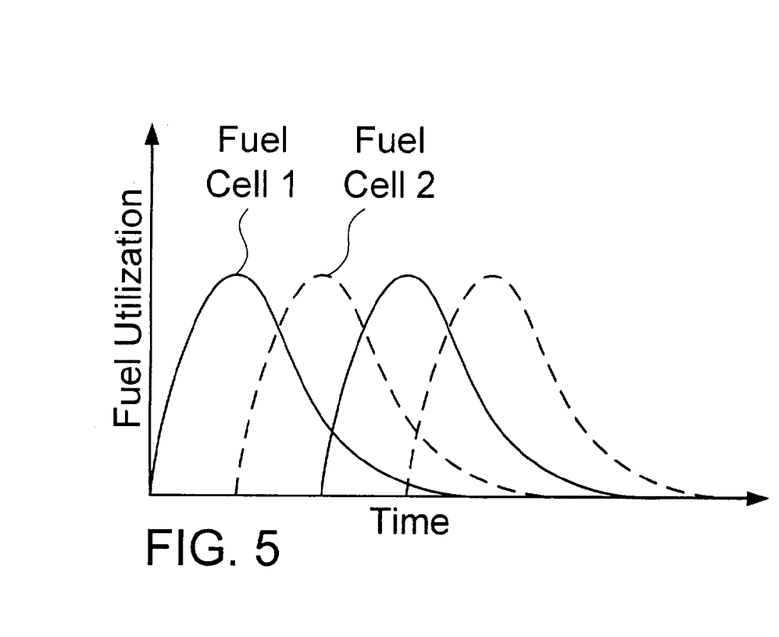
FIG. 5 is a graph showing a method in accordance with a preferred embodiment of a present invention.

The exemplary operational method described with reference to FIG. 4 will, in the exemplary embodiment, be employed in each fuel cell 102 in the system 100. Preferably, however, the individual fuel cells will be operated out of phase so that the system 100 will be able to provide a consistent power output. As illustrated for example in FIG. 5, a two fuel cell system may be operated such that the reactant pulses are 180° out of phase (i.e. 360°/N, where N is the number of cells or the number of different phases when a large number of cells are grouped in the manner illustrated below). The fuel utilization rate curve illustrated in FIG. 5 is indicative of the fuel concentration over time. As power is generated, the fuel concentration will be reduced with the integral of that curve with time. In other arrangements, such as a fuel cell system with 200 fuel cells, small numbers of the fuel cells can be grouped together. The fuel cells within each group will be operated (i.e. receive reactant pulses) in phase with one another, while the individual groups will operate out of phase with each other.

Figure 6:
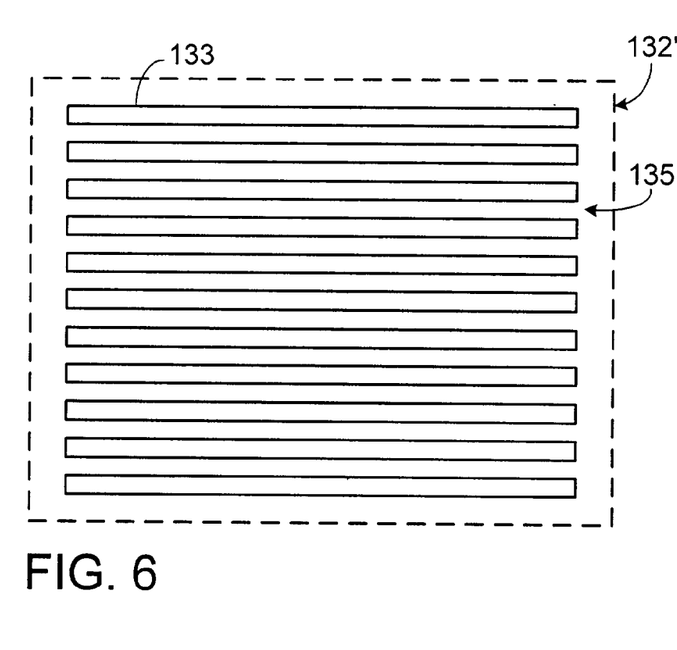
FIG. 6 is a diagrammatic view of an electrode with reactant channels in accordance with a preferred embodiment of a present invention.

The present inventions are also applicable to fuel cells in which one or more of the reactant passages are separated into a plurality of separate reactant channels. Referring to FIG. 6, a exemplary fuel passage 132' includes a plurality of separators 133 that divide the fuel passage into a plurality of individual fuel channels 135 which may be simple (as shown) or tortuous. The same arrangement may be provided to separate an oxidant passage into a plurality of oxidant channels. The reactant pulses may be pulsed out of phase from channel to channel, thereby providing a more consistent current draw/power modulation and higher fuel efficiency. The channels may also be grouped (e.g. into four groups) for purpose of pulse phasing. Here, channels within a particular group of channels will receive reactant pulses in phase with one another, while the groups will operate out of phase with each other. It should be noted that reactant channels may be employed in the exemplary embodiments described above with reference to FIGS. 1–5, as well as those described below with reference to FIGS. 7–9.

Although the sources of fuel, oxidant, and buffer material in the exemplary embodiments described above with reference to FIGS. 1–5 are pressurized, some or all of the sources may, alternatively, be non-pressurized. Here, vacuums may be provided on the fuel and/or oxidant exhaust sides to draw the fuel, oxidant, and buffer material (if used) through the respective inlet and outlet metering devices. The fuel, oxidant, and buffer material will preferably be drawn through the associated fuel cells in a series of pulses in the manner described above. Alternatively, the vacuums may be used to draw continuous streams of fuel, oxidant, and buffer material through the fuel cells.

Figure 7:
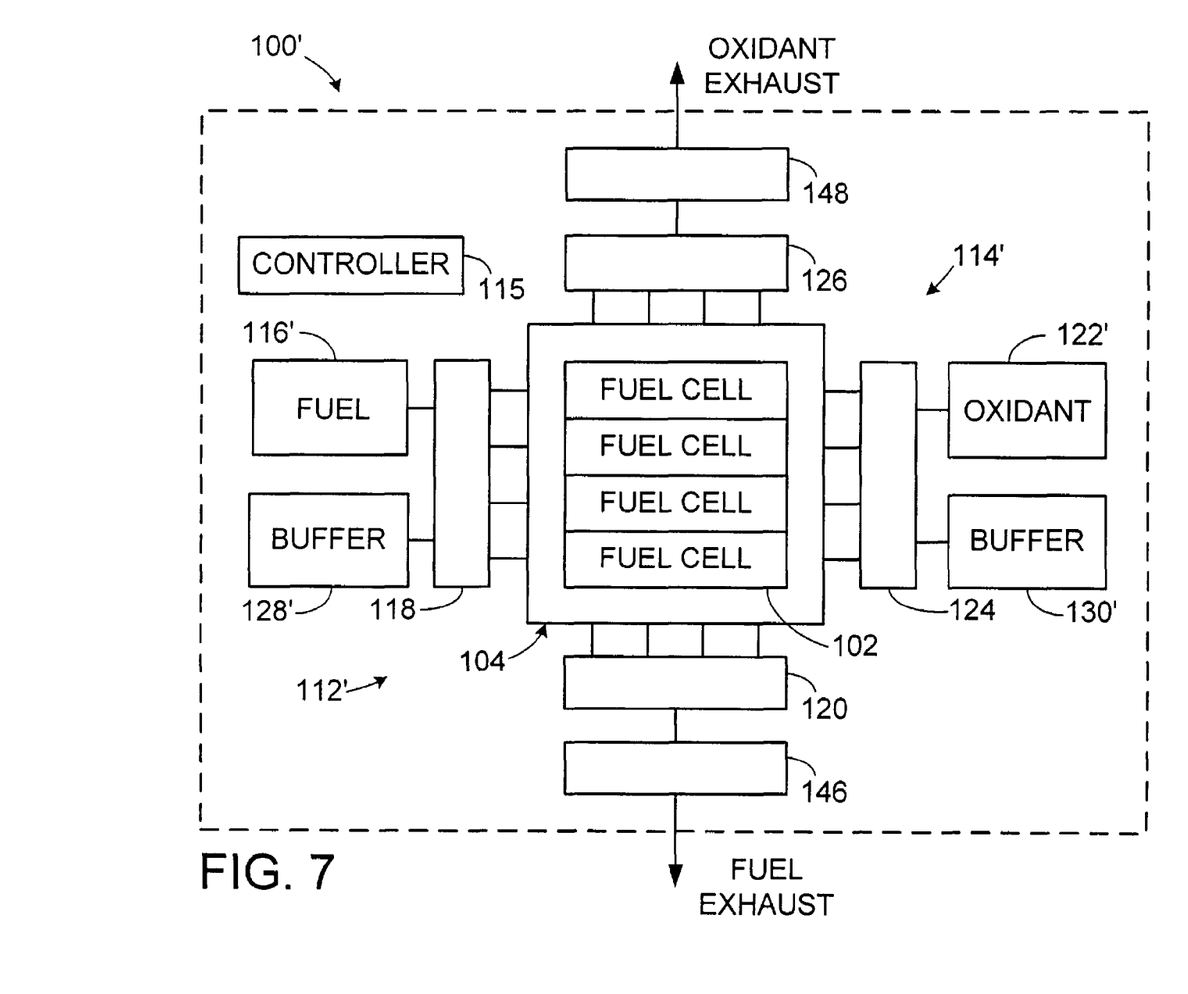
FIG. 7 is a diagrammatic view of a fuel cell system in accordance with a preferred embodiment of a present invention.

One example of a fuel cell system with a vacuum-based reactant supply is generally represented by reference numeral 100' in FIG. 7. The system is substantially similar to the exemplary fuel cell system 100 and similar elements are identified by similar reference numerals. Here, however, the fuel source 116', oxidant source 122' and buffer sources 128' and 130' in the fuel and oxidant supply systems 112' and 114' are not pressurized. Pumps 146 and 148 (or other vacuum creation apparatus) are provided to create a pressure gradient that draws fuel, oxidant and/or buffer material through the fuel cells 102. Pulses of fuel, oxidant and buffer material may be created by opening and closing valves in the valve systems 118, 120, 124 and 126 (or other metering devices) in the manner described above. It should be noted that a vacuum-based reactant supply may be used in conjunction with single reactant passage fuel cells, such as those described below with reference to FIGS. 8 and 9.

Figures 8, 9:
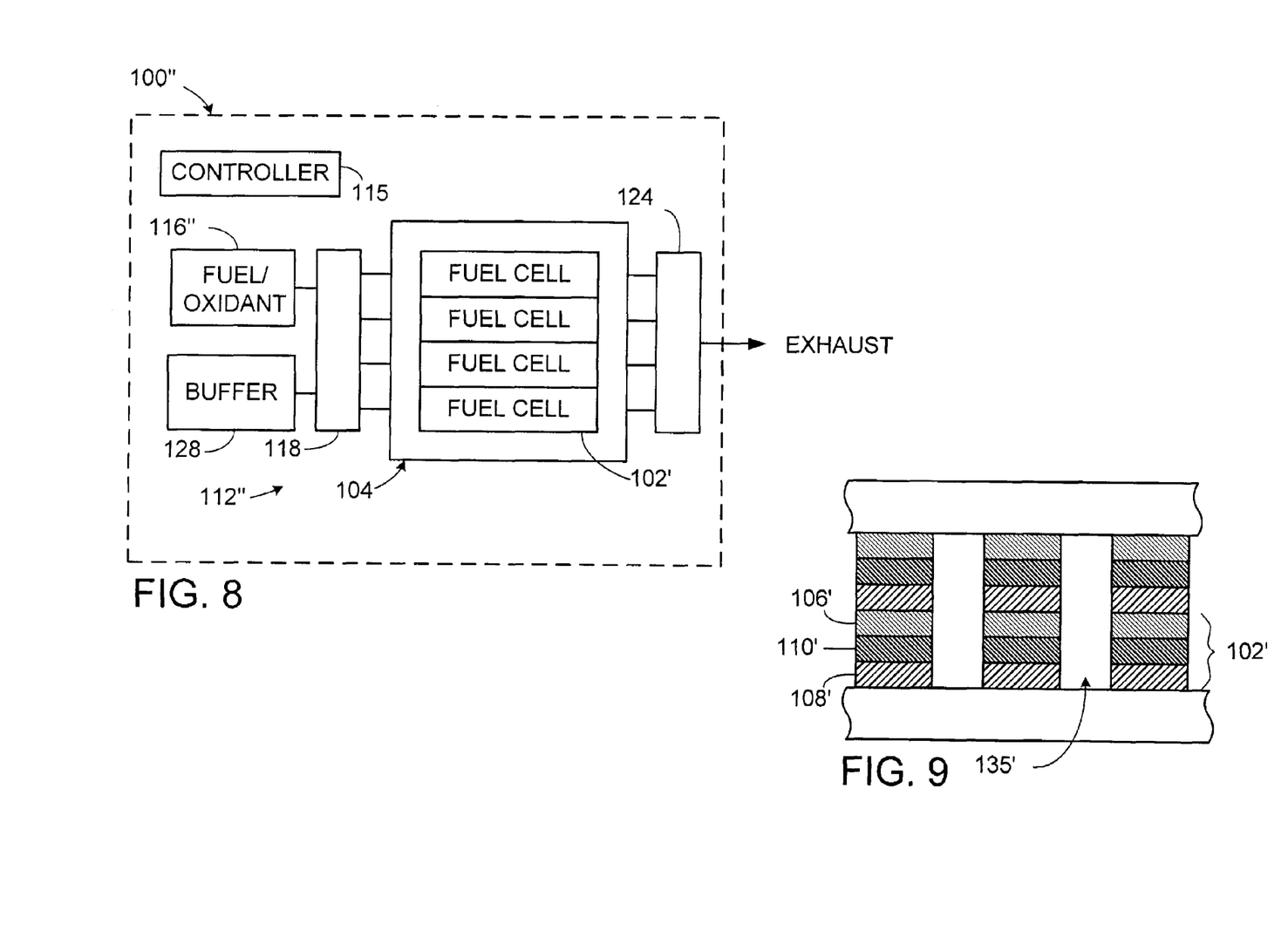
FIG. 8 is a diagrammatic view of a fuel cell system in accordance with a preferred embodiment of a present invention.
FIG. 9 is an end, partial section view of a plurality fuel cells in accordance with a preferred embodiment of a present invention.

The present inventions are also applicable to single reactant passage fuel cells, such as single reactant passage SOFCs, wherein the fuel and oxidant are mixed together and flow over the anode and cathode electrodes simultaneously. Accordingly, a reactant pulse in such a system consists of two reactants—fuel and oxidant. As illustrated for example in FIGS. 8 and 9, each fuel cell 102' in the exemplary fuel cell system 100" includes an anode 106' and a cathode 108' separated by an electrolyte 110'. The anode, cathode and electrolyte are preferably in the form of coplanar films. Protons generated at the anode diffuse along the anode side surface, the electrolyte side surface, or both towards the cathode side surface. Oxygen ions generated at the cathode diffuse along the cathode side surface, the electrolyte side surface, or both towards the anode side surface. The films are fabricated so as to connect the current collectors in the cathode and anode layers to respective cathode and anode current collector bases (not shown). The cells 102' may be stacked in the manner shown so as to define reactant passages 135' therebetween. Reactant pulses (here, combined fuel/oxidant pulses) may be delivered to the reactant passages 135' from a pressurized fuel/oxidant source 116" in a reactant supply system 112" in the manner described above. One or more pulses of buffer material may be delivered to the reactant passages 135' between the reactant pulses. Additional details concerning the fuel cell arrangement illustrated in FIGS. 8 and 9 are disclosed in commonly assigned U.S. application Ser. No. 10/166,999, entitled FUEL CELLS UTILIZING NON-POROUS NANOFILM MICROCHANNEL ARCHITECTURE, which is incorporated herein by reference.

Although the present inventions have been described in terms of the preferred embodiments above, numerous modifications and/or additions to the above-described preferred embodiments would be readily apparent to one skilled in the art. By way of example, but not limitation, the inventions herein also include embodiments where only one of the reactants is supplied in the pulsed fashion described above. It is intended that the scope of the present inventions extend to all such modifications and/or additions.

We claim:

1. A fuel cell system, comprising:
   a cathode; and
   a reactant system that supplies a first oxidant pulse to the cathode, supplies a buffer gas pulse, which has a different composition than the first oxidant pulse, that displaces unconsumed oxidant from the first oxidant pulse from a substantial portion of the cathode, and supplies a second oxidant pulse after the buffer gas pulse has displaced the unconsumed oxidant from the first oxidant pulse from the substantial portion of the cathode.

2. A fuel cell system as claimed in claim 1, further comprising:
   an anode;
   wherein the reactant system supplies a first fuel pulse to the anode, supplies a buffer gas pulse that displaces unconsumed fuel from the first fuel pulse from a substantial portion of the anode, and supplies a second fuel pulse after the buffer gas pulse has displaced the unconsumed fuel from the first fuel pulse from the substantial portion of the anode.

3. A fuel cell system, comprising:
   an anode and a cathode; and
   a reactant system that supplies a first fuel and oxidant mixture pulse to the anode and cathode, supplies a buffer gas pulse that displaces unconsumed fuel and oxidant mixture from the first fuel and oxidant mixture pulse from a substantial portion of the anode and cathode, and supplies a second fuel and oxidant mixture pulse after the buffer gas pulse has displaced the unconsumed fuel and oxidant mixture from the first fuel and oxidant mixture pulse from the substantial portion of the anode and cathode.

4. A fuel cell system as claimed in claim 3, wherein the buffer gas comprises at least one of water vapor, air or oxygen.

5. A fuel cell system, comprising:
   an electrode defining a surface, an inlet and an outlet; and
   a reactant system that supplies reactant pulses to the electrode surface in such a manner that the reactant in each reactant pulse will cover the electrode surface from the inlet to the outlet prior to substantially reacting with the electrode surface.

6. A fuel cell system as claimed in claim 5, wherein the electrode comprises an anode and the reactant comprises fuel.

7. A fuel cell system as claimed in claim 5, wherein the electrode comprises a cathode and the reactant comprises oxidant.

8. A fuel cell system as claimed in claim 5, wherein the electrode surface comprises a catalytic surface.

9. A fuel cell system as claimed in claim 5, wherein the electrode comprises an anode and a cathode and the reactant comprises a fuel and oxidant mixture.

10. A fuel cell system as claimed in claim 5, wherein the reactant system creates a pressure gradient across the electrode to draw reactant from the inlet to the outlet.

11. A fuel cell system as claimed in claim 5, wherein the reactant system supplies reactant to the electrode inlet under pressure.

12. A fuel cell system, comprising:
    a fuel cell including a fuel passage including a fuel inlet and a fuel outlet, an anode positioned adjacent to the fuel passage, an oxidant passage including an oxidant inlet and an oxidant outlet, and a cathode positioned adjacent to the oxidant passage; and
    a reactant system that supplies fuel pulses to the anode and oxidant pulses to the cathode and closes the inlets and outlets after each pulse.

13. A fuel cell system as claimed in claim 12, wherein the reactant system supplies at least one buffer pulse to the anode between the fuel pulses.

14. A fuel cell system as claimed in claim 12, wherein the reactant system supplies at least one buffer pulse to the cathode between the oxidant pulses.

15. A fuel cell system as claimed in claim 12, wherein the fuel is consumed at the anode between fuel pulses and the amount of time between successive fuel pulses is determined by the rate of fuel consumption at the anode.

16. A fuel cell system as claimed in claim 12, wherein the oxidant pulses and fuel pulses are substantially simultaneous.

17. A fuel cell system as claimed in claim 12, wherein the fuel is consumed at the anode between fuel pulses, the amount of fuel consumed at the anode is monitored, and the reactant system supplies a subsequent fuel pulse in response to a determination that a predetermined portion of the preceding fuel pulse has been consumed.

18. A fuel cell system as claimed in claim 17, wherein the oxidant pulses and fuel pulses are substantially simultaneous.

19. A fuel cell system as claimed in claim 12, wherein the fuel cell defines a first fuel cell, the fuel cell system further comprising:
    a second fuel cell;
    wherein the reactant system supplies fuel pulses and oxidant pulses to the second fuel cell that are out of phase with the fuel pulses and oxidant pulses that are supplied to the first fuel cell.

20. A method of operating a fuel cell, comprising the steps of:
    supplying a first oxidant pulse to a cathode;
    consuming at least a portion of the oxidant supplied in the first oxidant pulse;
    removing unconsumed oxidant from a substantial portion of the cathode with a buffer gas pulse, which has a different composition than the first oxidant pulse, prior to supplying a second oxidant pulse to the cathode; and
    supplying the second oxidant pulse to the cathode.

21. A method as claimed in claim 20, further comprising the step of:
    supplying a fuel pulse to an anode.

22. A method of operating a fuel cell including an electrode defining a surface, an inlet and an outlet, the method comprising the step of:
    supplying a reactant pulse to the electrode surface in such a manner that the reactant in the reactant pulse will cover the electrode surface from the inlet to the outlet prior to substantially reacting with the electrode surface.

23. A method as claimed in claim 22, wherein the step of supplying a reactant pulse to the electrode surface comprises supplying a fuel pulse to an anode surface.

24. A method as claimed in claim 22, wherein the step of supplying a reactant pulse to the electrode surface comprises supplying an oxidant pulse to a cathode surface.

25. A method as claimed in claim 22, further comprising the steps of:
consuming the reactant in the reactant pulse;
monitoring the consumption of the reactant in the reactant pulse; and
supplying a subsequent reactant pulse in response to a determination that a predetermined portion of the reactant in the reactant pulse has been consumed.

26. A method as claimed in claim 25, further comprising the step of:
purging the electrode surface prior supplying the subsequent reactant pulse.

27. A method as claimed in claim 26, wherein the step of purging the electrode surface comprises purging the electrode surface with a buffer gas.

28. A method of operating a fuel cell system including a fuel passage including a fuel inlet and a fuel outlet, an anode positioned adjacent to the fuel passage, an oxidant passage including an oxidant inlet and an oxidant outlet, and a cathode positioned adjacent to the oxidant passage, the method comprising the steps of:
supplying fuel pulses to the anode;
closing the fuel passage inlet and outlet after each fuel pulse;
supplying oxidant pulses to the cathode; and
closing the oxidant passage inlet and outlet after each oxidant pulse.

29. A method as claimed in claim 28, wherein the fuel cell system includes a first and second anodes and first and second cathodes, the step of supplying fuel pulses to the anode comprises supplying first fuel pulses to the first anode and supplying second fuel pulses to the second anode that are out of phase with the first fuel pulses.

30. A method as claimed in claim 29, wherein the step of supplying oxidant pulses to the cathode comprises supplying first oxidant pulses to the first cathode and supplying second oxidant pulses to the second cathode that are out of phase with the first oxidant pulses.

31. A fuel cell system, comprising:
a cathode; and
means for supplying a first oxidant pulse to the cathode, a buffer gas pulse, which has a different composition than the first oxidant pulse, that displaces unconsumed oxidant from the first oxidant pulse from a substantial portion of the cathode, and a second oxidant pulse after the buffer gas pulse has displaced the unconsumed oxidant from the first oxidant pulse from the substantial portion of the cathode.

32. A fuel cell system as claimed in claim 31, further comprising:
an anode; and
means for supplying a first fuel pulse to the anode, a buffer gas pulse that displaces unconsumed fuel from the first fuel pulse from a substantial portion of the anode, and a second fuel pulse after the buffer gas pulse has displaced the unconsumed fuel from the first fuel pulse from the substantial portion of the anode.

33. A fuel cell system, comprising:
an anode and a cathode; and
means for supplying a first fuel and oxidant mixture pulse to the anode and cathode, a buffer gas pulse that displaces unconsumed fuel and oxidant mixture from the first fuel and oxidant mixture pulse from a substantial portion of the anode and cathode, and a second fuel and oxidant mixture pulse after the buffer gas pulse has displaced the unconsumed fuel and oxidant mixture from the first fuel and oxidant mixture pulse from the substantial portion of the anode and cathode.

34. A fuel cell system, comprising:
an electrode defining a surface, an inlet and an outlet; and
reactant supply means for supplying reactant pulses to the electrode surface in such a manner that the reactant in each react pulse will cover the electrode surface from the inlet to the outlet prior to substantially reacting with the electrode surface.

35. A fuel cell system as claimed in claim 34, wherein the electrode comprises an anode and the reactant comprises fuel.

36. A fuel cell system as claimed in claim 34, wherein the electrode comprises a cathode and the reactant comprises oxidant.

37. A fuel cell system as claimed in claim 34, wherein the electrode comprises an anode and a cathode and the reactant comprises a fuel and oxidant mixture.

38. A fuel cell system, comprising:
a fuel cell including a fuel passage including a fuel inlet and a fuel outlet, an anode positioned adjacent to the fuel passage, an oxidant passage including an oxidant inlet and an oxidant outlet, and a cathode positioned adjacent to the oxidant passage; and
reactant supply means for supplying fuel pulses to the anode and oxidant pulses to the cathode and closing the inlets and outlets after each pulse.

39. A fuel cell system as claimed in claim 38, wherein the reactant supply means supplies buffer pulses to the anode between the fuel pulses.

40. A fuel cell system as claimed in claim 38, wherein the reactant supply means supplies buffer pulses to the cathode between the oxidant pulses.

41. A fuel cell system as claimed in claim 38, wherein the fuel is consumed at the anode between fuel pulses, the system further comprising:
monitoring means for monitoring the amount of fuel consumed at the anode;
wherein the reactant supply means supplies a subsequent fuel pulse in response to a determination that a predetermined portion of the preceding fuel pulse has been consumed.

42. A fuel cell system as claimed in claim 38, wherein the fuel cell defines a first fuel cell, the fuel cell system further comprising:
a second fuel cell;
wherein the reactant supply means supplies fuel pulses and oxidant pulses to the second fuel cell that are out of phase with the fuel pulses and oxidant pulses that are supplied to the first fuel cell.

43. A fuel cell system, comprising:
an electrode;
a reactant passage, defining an inlet and an outlet, associated with the electrode; and a reactant system that creates a pressure gradient across the reactant passage to draw reactant from the inlet to the outlet while the reactant is being supplied to the inlet.

44. A fuel cell system as claimed in claim 43, wherein the electrode comprises an anode and the reactant comprises fuel.

45. A fuel cell system as claimed in claim 43, wherein the electrode comprises a cathode and the reactant comprises oxidant.

46. A fuel cell system as claimed in claim 43, wherein the electrode comprises an anode and a cathode and the reactant comprises a fuel and oxidant mixture.

47. A fuel cell system as claimed in claim 43, wherein the reactant system includes a vacuum creation apparatus associated with the reactant passage outlet.

48. A fuel cell system as claimed in claim 43, wherein the reactant system draws a series of reactant pulses from the inlet to the outlet.

49. A method of operating a fuel cell, comprising the steps of:
   creating a pressure gradient across a reactant passage, defining an inlet and an outlet, associated with an electrode; and
   drawing reactant through the reactant passage from the inlet to the outlet while reactant is being supplied to inlet.

50. A method as claimed in claim 49, wherein the step of creating a pressure gradient comprises creating a vacuum force at a reactant passage outlet.

51. A method as claimed in claim 49, wherein the step of drawing reactant through the reactant passage comprises drawing a series of reactant pulses through the reactant passage.

52. A method as claimed in claim 49, wherein the step of drawing reactant through the reactant passage comprises drawing fuel through the reactant passage.

53. A method as claimed in claim 49, wherein the step of drawing reactant through the reactant passage comprises drawing oxidant through the reactant passage.

54. A method as claimed in claim 49, wherein the step of drawing reactant through the reactant passage comprises drawing a fuel and oxidant mixture through the reactant passage.

55. A fuel cell system as claimed in claim 4, wherein the buffer gas comprises at least one of water vapor, air or oxygen.

56. A method as claimed in claim 21, further comprising the step of:
   consuming at least a portion of the fuel supplied in the first fuel pulse;
   removing unconsumed fuel from a substantial portion of the anode with a buffer gas prior to supplying a second fuel pulse to the anode; and
   supplying the second fuel pulse to the anode.

* * * * *

UNITED STATES PATENT AND TRADEMARK OFFICE
CERTIFICATE OF CORRECTION

PATENT NO.         : 7,122,257 B2
APPLICATION NO.    : 10/167356
DATED              : October 17, 2006
INVENTOR(S)        : David Champion et al.

It is certified that error appears in the above-identified patent and that said Letters Patent is hereby corrected as shown below:

In column 12, line 16, in Claim 55, delete "claim 4" and insert -- claim 5 --, therefor.

Signed and Sealed this

Twenty-second Day of December, 2009

David J. Kappos
*Director of the United States Patent and Trademark Office*